United States Patent
Shiraishi

(10) Patent No.: US 11,458,664 B2
(45) Date of Patent: Oct. 4, 2022

(54) INJECTION MOLDING SYSTEM

(71) Applicant: FANUC CORPORATION, Yamanashi (JP)

(72) Inventor: Wataru Shiraishi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 83 days.

(21) Appl. No.: 17/108,264

(22) Filed: Dec. 1, 2020

(65) Prior Publication Data

US 2021/0187810 A1 Jun. 24, 2021

(30) Foreign Application Priority Data

Dec. 24, 2019 (JP) .............................. JP2019-232641

(51) Int. Cl.
B29C 45/76 (2006.01)

(52) U.S. Cl.
CPC .... B29C 45/768 (2013.01); *B29C 2945/7629* (2013.01); *B29C 2945/76163* (2013.01); *B29C 2945/76464* (2013.01); *B29C 2945/76949* (2013.01); *B29C 2945/76979* (2013.01)

(58) Field of Classification Search
CPC ........ B29C 45/768; B29C 2945/76949; B29C 2945/76979
See application file for complete search history.

(56) References Cited

U.S. PATENT DOCUMENTS

2021/0001526 A1* 1/2021 Hirano ..................... G06N 5/04

FOREIGN PATENT DOCUMENTS

| JP | 2-185230 | | 7/1990 |
| JP | 02185230 A | * | 7/1990 |
| JP | 2015-123262 | | 7/2015 |
| JP | 2017-30152 | | 2/2017 |
| JP | 2019-166702 | | 10/2019 |

OTHER PUBLICATIONS

Translation of JP-02185230-A (Year: 1990).*

* cited by examiner

*Primary Examiner* — Niki Bakhtiari
*Assistant Examiner* — John J DeRusso
(74) *Attorney, Agent, or Firm* — Wenderoth, Lind & Ponack, L.L.P.

(57) ABSTRACT

An injection molding system includes a measuring unit to measure a movement of a line of sight of a worker observing a molded article, a line-of-sight data storage unit to store line-of-sight information representing movements of the worker's line of sight and a measurement time, an identifying unit to identify a focus area of the molded article, a focus area storage unit to store an image of the identified focus area, a molding defect type input unit to input or select a molding defect type, and a machine learning device to machine learn the molding defect type from the image of the focus area. The machine learning device inputs a type of a molding defect that has occurred in the molded article and carries out machine learning to learn and automatically recognize a feature quantity of the molding defect from the image of the focus area.

13 Claims, 13 Drawing Sheets

FIG. 3
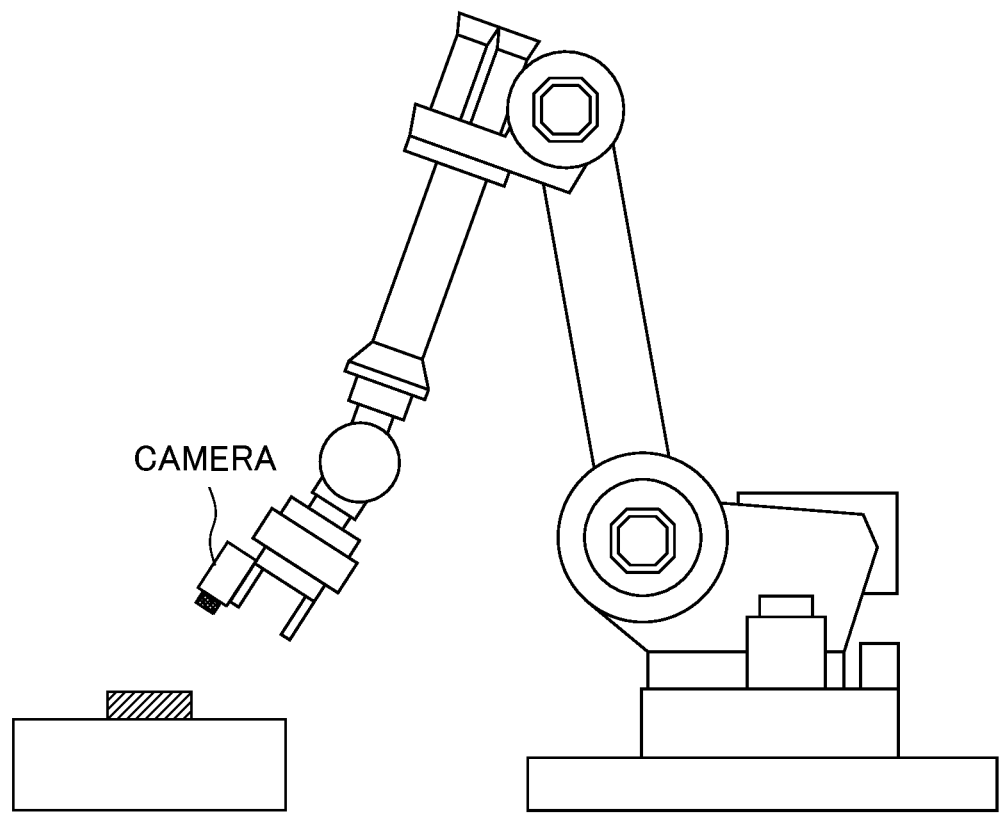
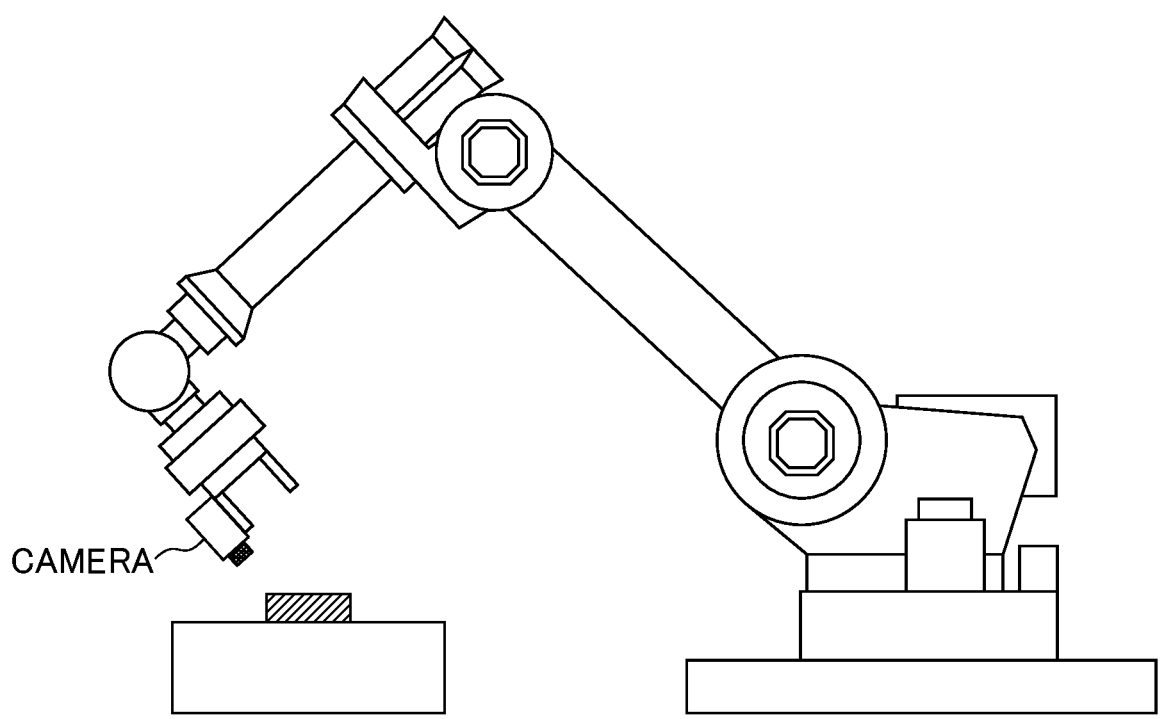

INJECTION MOLDING SYSTEM

This application is based on and claims the benefit of priority from Japanese Patent Application 2019-232641, filed on 24 Dec. 2019, the content of which is incorporated herein by reference.

BACKGROUND OF THE INVENTION

Field of the Invention

The present invention relates to an injection molding system.

Related Art

In injection molding, minute molding defects such as sink marks, warpages, weld lines, silver streaks, discoloration etc. may occur in a molded article. Such minute molding defects are often difficult to catch by referencing only physical data such as maximum injection pressure, minimum cushion amount, metering time, pressure waveform, etc., which are referenced when generally adjusting injection molding conditions. Eliminating such molding defects required a highly knowledgeable and experienced expert to adjust the molding conditions while not only referring to the physical data, but also visually determining any minute irregularities in the molded article.

In this regard, techniques for optimizing the molding conditions of injection molding using machine learning and techniques for generating simulation data to perform machine learning are known. For example, see Patent Document 1 and Patent Document 2.

Patent Document 1: Japanese Unexamined Patent Application, Publication No. 2017-30152
Patent Document 2: Japanese Unexamined Patent Application, Publication No. 2019-166702

SUMMARY OF THE INVENTION

There are cases where molding defects are only observed in a partial area of a molded article. Therefore, when performing machine learning using an image of the whole molded article, there was a risk in that optimization of molding conditions may be difficult or time-consuming, due to poor precision of the machine learning, or the results of the machine learning only being usable for a specific molded article.

Further, while it would be possible to manually edit the obtained image of the molded article to move or magnify the molding defects, this would demand inefficient manual labor, and it would be difficult to manually edit the molded article image of each shot in a continuous molding process which can take from a few seconds to several tens of seconds. Therefore, there was a risk that performing optimization of injection molding conditions using an image of the molded article would present difficulties.

It would thus be desirable for workers other than highly experienced workers to be able to easily spot locations in molded articles where molding defects can easily occur.

An aspect of an injection molding system according to the present disclosure includes a line-of-sight measuring unit configured to measure a movement of a line of sight of a worker observing a molded article molded by injection molding; a line-of-sight data storage unit configured to store line-of-sight information representing movements of the worker's line of sight measured by the line-of-sight measuring unit and a measurement time at which the line-of-sight information was measured; a focus area identifying unit configured to, based on the line-of-sight information and the measurement time, identify a focus area of the molded article that the worker has focused on for a predetermined time or more and/or looked at a predetermined number of times or more; a focus area storage unit configured to store an image of the focus area identified by the focus area identifying unit out of images of the molded article; a molding defect type input unit configured to input or select a molding defect type; and a machine learning device configured to machine learn the molding defect type from the image of the focus area, wherein the machine learning device inputs a type of a molding defect that has occurred in the molded article and carries out machine learning to learn and automatically recognize a feature quantity of the molding defect from the image of the focus area stored in the focus area storage unit.

According to one aspect of the present invention, a worker other than a highly experienced worker can spot locations easily in molded articles where molding defects can easily occur.

BRIEF DESCRIPTION OF THE DRAWINGS

FIG. 3 is a drawing showing an example of a camera being mounted to a robot;

DETAILED DESCRIPTION OF THE INVENTION

A first embodiment of the present disclosure is described below with reference to the drawings. In this description, a molded article and focus area in the learning phase and a molded article and focus area in the operation phase are considered the same. However, the present invention is not so limited, and the molded article and focus area in the learning phase and the molded article and focus area in the operation phase may differ.

First Embodiment

Figure 1:
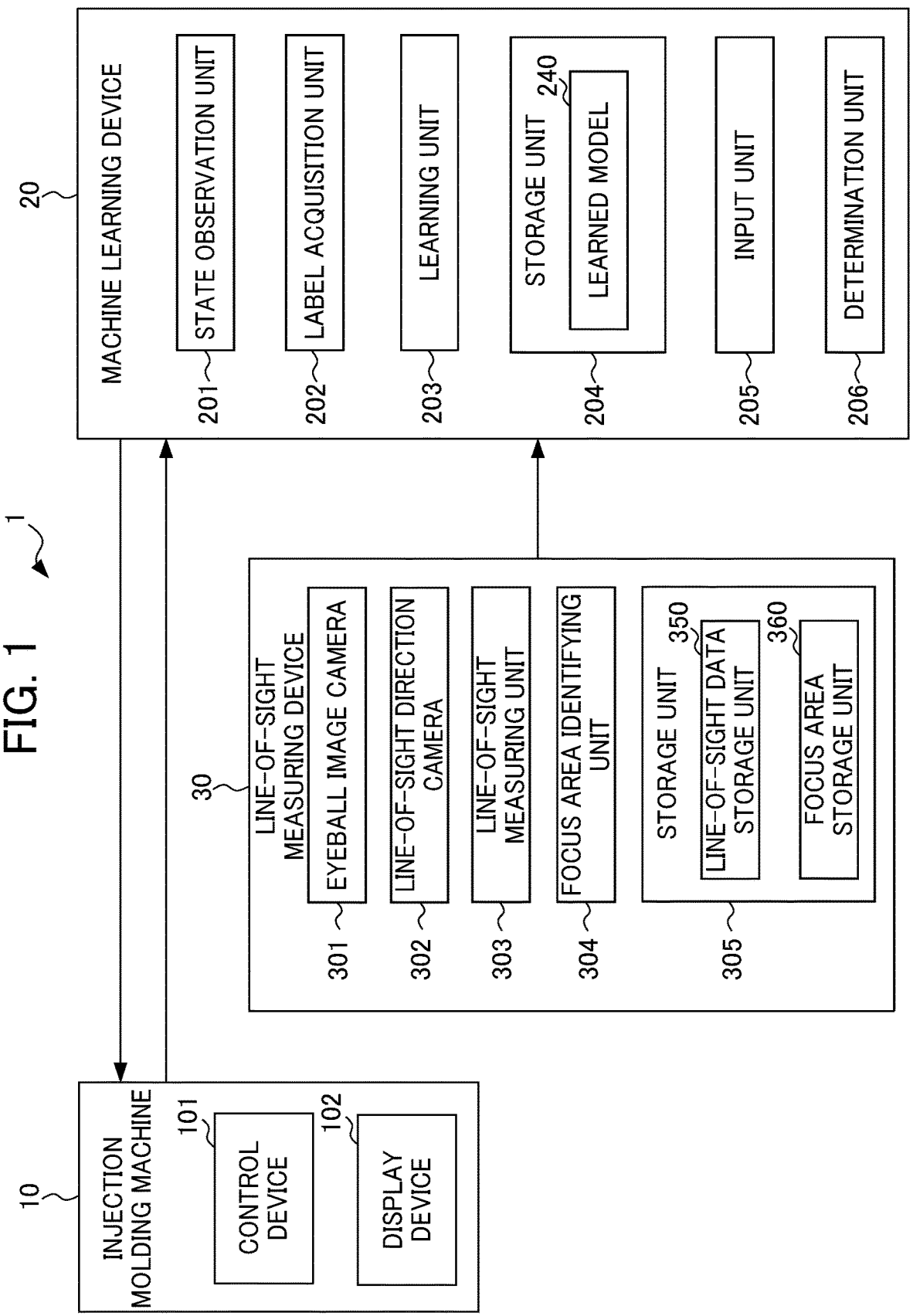
FIG. 1 is a functional block diagram showing a functional configuration example of an injection molding system according to a first embodiment of the present invention.

FIG. 1 is a functional block diagram showing a functional configuration example of an injection molding system according to a first embodiment of the present invention. As shown in FIG. 1, the injection molding system 1 has an injection molding machine 10, a machine learning device 20, and a line-of-sight measuring device 30.

The injection molding machine 10, the machine learning device 20, and the line-of-sight measuring device 30 may be directly connected to one another via a connection interface not shown here. The injection molding machine 10, the machine learning device 20, and the line-of-sight measuring device 30 may be connected to one another via a network not shown here, such as a local area network (LAN) or the Internet. In this case, the injection molding machine 10, the machine learning device 20, and the line-of-sight measuring device 30 include communication units, not shown, for communicating with one another via the connection. Further, as described below, the injection molding machine 10 may be configured to include the machine learning device 20.

<Injection Molding Machine 10>

The injection molding machine 10 is an injection molding machine that is well known to a person skilled in the art, and incorporates a control device 101 and a display device 102. The injection molding machine 10 operates based on an operation command from the control device 101. It should be noted that the control device 101 may be a device that is independent of the injection molding machine 10.

The control device 101 is a numerical control device that is well known to a person skilled in the art, and generates an operation command based on control information, and transmits the generated operation command to the injection molding machine 10. The control device 101 thus controls operation of the injection molding machine 10. The control information includes a processing program and parameter values set in the control device 101.

The display device 102 is a liquid crystal display or the like. The display device 102 displays data indicating the operating state of the injection molding machine 10 controlled by the control device 101.

Further, when a molding defect has been recognized in the molded article a worker has looked at as described below, the display device 102 may be configured to display a molding defect type screen for letting the worker input a type of molding defect via an input device (not shown) such as a touch panel or the like included in the display device 102, or a molding defect type selection screen for letting the worker select a type of molding defect. Thus, when a worker has recognized a molding defect, it becomes possible to, as described below, store the type of the molding defect as label information for machine learning in, for example, a storage unit (not shown) included in the injection molding machine 10. Moreover, molding defect types are stored corresponding to the focus areas the worker has looked at, as described below.

In addition, when a molding defect type of a molded article is input into the display device 102 by a highly experienced worker on the molding defect type screen via the input device (not shown) of the display device 102, the injection molding machine 10 or the control device 101 may be configured to associate the input molding defect type with a focus area looked at by the worker described below and output the input molding defect type to the machine learning device 20 described below. The screen for inputting the molding defect type may be displayed, for example, on a display device (not shown) of a personal computer, etc. of the injection molding system 1.

In addition, when the molding conditions have been adjusted by a highly experienced worker allowing for a good article to be molded, the display device 102 may display an adjustment completion input unit (not shown) which is a condition adjustment completion button for inputting a molding condition adjustment completion signal into the machine learning device 20. It should be noted that the adjustment completion input unit (not shown) may be constituted by a condition adjustment completion button or an automatic button that starts continuous molding provided on an operating panel of the injection molding machine 10 or the control device 101, or by a voice recognition device (not shown) included in the injection molding machine 10 and which detects the voice of a worker such as a highly experienced worker indicating that adjustment has been completed. This makes it possible to notify the machine learning device 20 that the system is in a state where good articles are molded.

In addition, after mass-production molding has been started as described below, when a molding defect has been automatically recognized by the machine learning device 20 functioning as a molding defect determination device, the display device 102 may display the type of the molding defect. In this case, a worker may, for example, stop the molding, or discard the defective article by inputting a signal into a well-known good/defective article sorting device (not shown).

If the molding defect is eliminated by the worker stopping the molding and adjusting the molding conditions for the molded article, the worker can be notified via the display device 102 that the molding defect has been eliminated. The display device 102 may be configured to notify that the molding defect has been eliminated by deleting the display relating to the molding defect.

<Line-of-Sight Measuring Device 30>

The line-of-sight measuring device 30 is worn by, for example, a highly skilled worker, and measures a line of sight of the worker. The line-of-sight measuring device 30 has an eyeball image camera 301, a line-of-sight direction camera 302, a line-of-sight measuring unit 303, a focus area identifying unit 304, and a storage unit 305.

Figure 2:
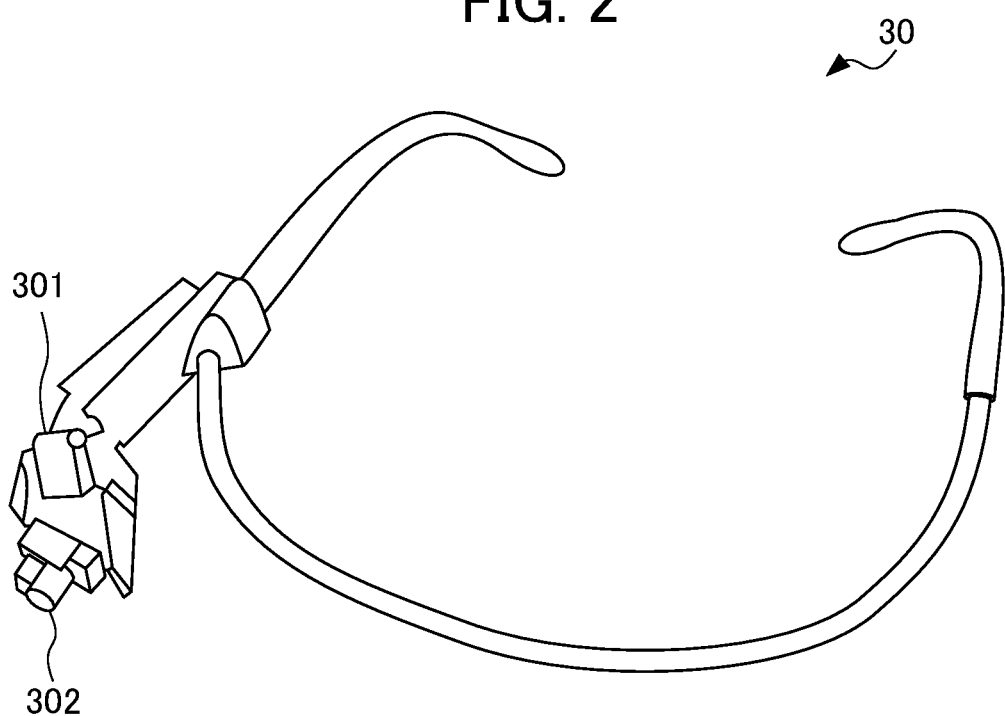
FIG. 2 is a drawing showing an example of a line-of-sight measuring device.

FIG. 2 is a drawing showing an example of the line-of-sight measuring device 30.

As shown in FIG. 2, the line-of-sight measuring device 30 is, for example, a structure in the form of a pair of eyeglasses, provided with the eyeball image camera 301, the line-of-sight direction camera 302, the line-of-sight measuring unit 303, the focus area identifying unit 304, and the storage unit 305. It should be noted that in FIG. 2, the line-of-sight measuring unit 303, the focus area identifying unit 304, and the storage unit 305 are omitted.

The eyeball image camera 301 is a digital camera for capturing an eyeball image of the worker.

The line-of-sight direction camera 302 is a digital camera for capturing an image of a line-of-sight direction of the worker, including an object the worker is focusing on.

Further, the following configuration may be applied as the line-of-sight measuring device 30.

As disclosed, for example, in Japanese Unexamined Patent Application, Publication No. H2-185230, instead of the line-of-sight direction camera 302, the injection molding system 1 may include a camera as a molded article capturing unit that is fixedly provided separately from the line-of-sight measuring device 30 and which captures an image of a molded article that is injection molded by the injection molding machine 10. In this case, the injection molding system 1 may have the camera communicably connected to the display device 102 or a computer monitor etc. to display the captured image of the molded article on the display device 102 or the computer monitor etc.

The worker may focus on the image of the molded article captured by the camera. In this case, the eyeball image camera 301 for measuring focus position coordinates of the line of sight of the worker's eyeballs may be configured to measure the focus position coordinates (focus position) of the line of sight of the worker's eyeballs in the image of the molded article displayed on the display device 102 on which the worker wearing the line-of-sight measuring device is focusing.

In addition, when a molding defect has been automatically recognized or the focus area identifying unit 304 described below has identified a focus area of the worker, the automatically detected molding defect location of the molded article or the focus area may be magnified and displayed on a monitor such as the display device 102. This makes it easier to see the molding defect location and makes molding condition adjustment more efficient. The magnification of the magnified display may be preset at x2, x5, etc. The magnified display may also be magnified as much as possible within a range that includes the area of the automatically recognized molding defect and the full extent of the focus area.

Further, as shown in FIG. 3, the camera may be mounted to a robot as a molded article capturing position moving unit. By making the camera movable, the molded article can be photographed from any direction inside a mold, or the molded article can be photographed on a conveyor or worktable after being removed from the mold. In cases where it is difficult to see molding defects due to reflected light etc., making it possible to capture images of the molded article from various directions can make it easier to see the molding defect locations. Further, by mounting the camera to a robot for removing the molded article, the system can be composed of a single robot. Moreover, a coordinate system of the fixedly provided camera, a machine coordinate system of the injection molding machine 10, and coordinate systems of the camera and the robot, may be calibrated in advance using a well-known method.

As disclosed, for example, in Japanese Unexamined Patent Application, Publication No. 2015-123262, the line-of-sight measuring unit 303 uses an eyeball model to generate a tangential plane spread out image from an eyeball image captured by the eyeball image camera 301. The line-of-sight measuring unit 303 measures a focus point (line of sight) of the worker by matching a generated tangential plane spread out image with an image captured by the line-of-sight direction camera 302. The line-of-sight measuring unit 303 then outputs line-of-sight information that is the measured focus point and a measurement time at which the line-of-sight information was measured to the storage unit 305 (line-of-sight data storage unit 350) described below.

The focus area identifying unit 304 reads the line-of-sight information and measurement time measured by the line-of-sight measurement unit 303 from the storage unit 305 described below.

A worker, including a highly experienced worker, will focus on the same position for a longer time when the symptoms of molding defects are smaller or more difficult to identify. A worker will also focus on the same position many times, while changing the orientation of the molded article to adjust the lighting. Further, as a worker focuses on the same position of each molded article during molding, the number of times the worker looks tends to increase only at a specific position. Therefore, by integrating the focus time and the number of times the worker looks, the focus position can be extracted (identified). Further, in case several focus positions have been extracted, it can be determined that molding defects have occurred in combination at different positions or of different types.

Thus, the focus area identifying unit 304 is configured to, based on the read line-of-sight information and measurement time, identify a focus area of a molded article that a worker such as a highly experienced worker has focused on for a predetermined time (for example, 1 second) or longer, or that the worker has looked at a predetermined number of times (for example, 5 times) or more.

The focus area identifying unit 304 stores the identified focus area in the storage unit 305 (focus area storage unit 360) described below. The predetermined time and predetermined number of times may be suitably determined according to the required quality of the molded article or the level of experience etc. of the highly experienced worker.

Figure 4A:
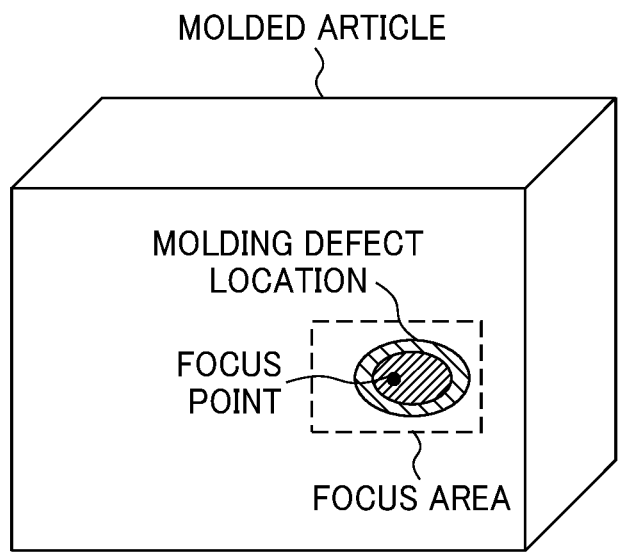
FIG. 4A is a drawing showing an example of a focus area identified by a focus area identifying unit.
Figure 4B:
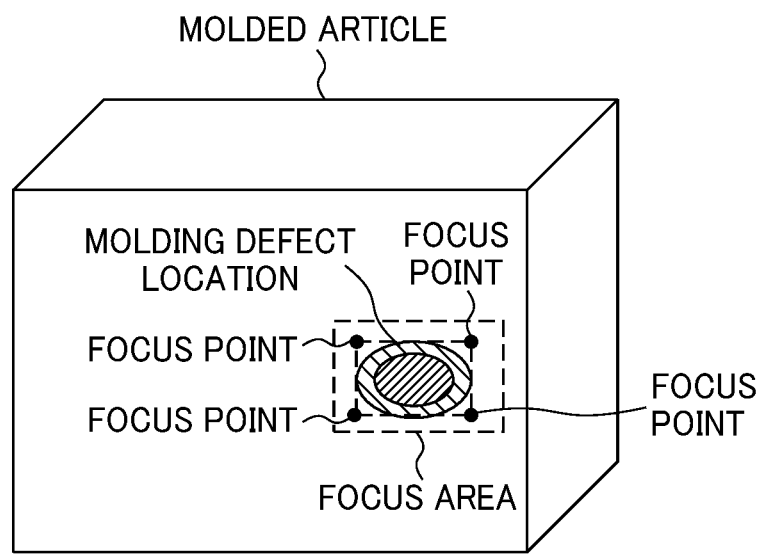
FIG. 4B is a drawing showing an example of a focus area identified by the focus area identifying unit.

FIG. 4A and FIG. 4B are drawings showing an example of a focus area identified by the focus area identifying unit 304.

As shown in FIG. 4A, the focus area identifying unit 304 may extract from the image captured by the line-of-sight direction camera 302 an area of a preset shape centered on the focus point of the molding defect location measured by the line-of-sight measuring unit 303, for example, a rectangular area centered on the focus point, and identify it as the focus area. The size of the area may be suitably adjusted according to the size of the molding defect location.

Further, since a human focuses on the molding defect with a slight variance in the focus point, there are cases where the molding defect image will not fit within the area around the focus point. Therefore, as shown in FIG. 4B, the focus area identifying unit 304 may identify as the focus area an area 1 to 4 times larger than the area surrounding a plurality (for example, 4) of focus points measured by the line-of-sight measuring unit 303, and including the surrounding area. Since the coordinates of the focus points on the screen are known, the calculation for magnifying the area can be performed easily.

In addition, the focus area identifying unit 304 may extract (identify) a plurality of focus areas. In this case, the molding injection system 1 can determine whether molding defects have occurred in combination at different positions or of different types.

In addition, when the focus area identifying unit 304 has identified a focus area of a worker, the control device 101 of the injection molding machine 10 may be configured to magnify and display the focus area on the display device 102. This makes it easier to see the molding defect location and makes molding condition adjustment more efficient. The magnification of the magnified display may be preset at x2, x5, etc. The magnified display may also be magnified as much as possible within a range that includes the full extent of the focus area.

The storage unit 305 is a memory such as Random Access Memory (RAM), and may store line-of-sight data and the focus area.

The line-of-sight storage unit 350 stores line-of-sight information and measurement time measured by the line-of-sight measuring unit 303.

The focus area storage unit 360 stores an image of the focus area identified by the focus area identifying unit 304 in the image captured by the line-of-sight direction camera 302.

<Machine Learning Device 20>

The machine learning device 20, in a learning phase, carries out supervised learning based on training data described below to generate a learned model. Specifically, supervised learning is carried out using an image of the focus area identified by the focus area identifying unit 304 as input data and molding defect types (including a case considered "good") based on the image as label data.

Then, in an operation phase, the machine learning device 20 determines whether or not a molded article is defective based on the learned model. Specifically, by inputting the image of the identified focus area of the molded article into the learned model generated by the machine learning device 20 in the learning phase, the machine learning device 20 can determine whether or not the molded article is defective based on the identified focus area and determine the molding defect type in case the molded article has been determined to be defective. In the operation phase, the image of the identified focus area of the molded article may be captured by the line-of-sight direction camera 302 of the line-of-sight measuring device 30 worn by a worker. The image may also be captured by the aforementioned camera used as a molded article capturing unit or a camera mounted to a robot. Hereinafter, unless otherwise specified, whenever the "line-of-sight direction camera 302 etc." is used, it shall include the aforementioned camera used as a molded article capturing unit or a camera mounted to a robot.

Next, the machine learning process for the machine learning device 20 to generate the learned model is described.

<The Machine Learning Device 20 in the Learning Phase>

The machine learning device 20 in the learning phase, acquires input data including an image of the focus area identified by the focus area identifying unit 304 out of, for example, images of the molded article formed by injection molding captured in advance by the line-of-sight measuring device 30 worn by a highly experienced worker when adjusting the molding conditions.

In addition, the machine learning device 20 acquires data indicating a molding defect type of the molded article corresponding to the image of the focus area of the acquired input data as a label (correct answer).

The machine learning device 20 carries out supervised learning using training data of a set of the acquired input data and label to construct the learned model described below. The machine learning device 20 functioning as a machine learning device in the learning phase is described in specific terms below.

As shown in FIG. 1, the machine learning device 20 in the learning phase includes a state observation unit 201, a label acquisition unit 202, a learning unit 203, and a storage unit 204.

Moreover, the machine learning device 20 includes a processor such as a central processing unit (CPU) (not shown) in order to realize the functional blocks shown in FIG. 1. The machine learning device 20 also includes an auxiliary storage unit such as a read only memory (ROM) or Hard Disk Drive (HDD) (not shown) and a main storage unit such as a RAM (not shown) for storing data temporarily required for the processor to execute a program.

In the machine learning device 20, the processor reads an Operating System (OS) and application software from the auxiliary storage unit and deploys the read OS and application software to the main storage unit and performs operating processes based on the OS and application software. Based on these operating processes, the machine learning device 20 controls each piece of hardware. The processes by the functional blocks shown in FIG. 1 are thus realized. In other words, the machine learning device 20 can be realized through cooperation of hardware and software. The machine learning device 20 may also be realized as an electronic circuit.

In the learning phase, the state observation unit 201 acquires, via a communication unit not shown here, an image of the focus area identified by the focus area identifying unit 304 as input data from the storage unit 305 (focus area storage unit 360), out of images of the molded article injection molded by the injection molding machine 10 and captured in advance by the line-of-sight measuring device 30 worn by a highly experienced worker when adjusting the molding conditions.

In a case where there are multiple focus areas, the state observation unit 201 may acquire an image of each of the focus areas as input data.

In addition, the state observation unit 201 may acquire the aforementioned input data until a highly experienced worker pushes the condition adjustment completion button as an adjustment completion input unit (not shown) displayed on the display unit 102 when molding condition adjustment has finished and good articles can be molded and the machine learning device 20 receives the molding condition adjustment completion signal. It is preferable that the state observation unit 201 also receives as input data images in which the molding defect in the focus area has been eliminated and the molding has been determined to be good. By doing so, an unbiased learning model can be generated.

The state observation unit 201 outputs the acquired input data to the storage unit 204.

The label acquisition unit 202 acquires data indicating molding defect types of the molded article corresponding to each image of the focus areas included in the input data as label data (correct answer data), and outputs the acquired label data to the storage unit 204.

Specifically, the label acquisition unit 202 acquires, for example, a molding defect type of the molded article of each image of the focus areas input by a highly experienced worker on the molding defect type screen displayed on the display unit 102 and stored as label data (correct answer data) in a storage unit (not shown) of the injection molding machine 10. Alternatively, the label acquisition unit 202 may acquire a molding defect type of the molded article of each image of the focus areas selected by a highly experienced worker on the molding defect type selection screen displayed on the display unit 102 and stored as label data (correct answer data) in a storage unit (not shown) of the injection molding machine 10.

The label includes at least one or more of, for example, discoloration (change in hue, brightness, or saturation), flashing, sink marks, warpages, twisting, voids, short shot, weld lines, jetting, flow marks, stringiness, insufficient filling, delamination, silver streaks, and black spots.

Figure 5A:
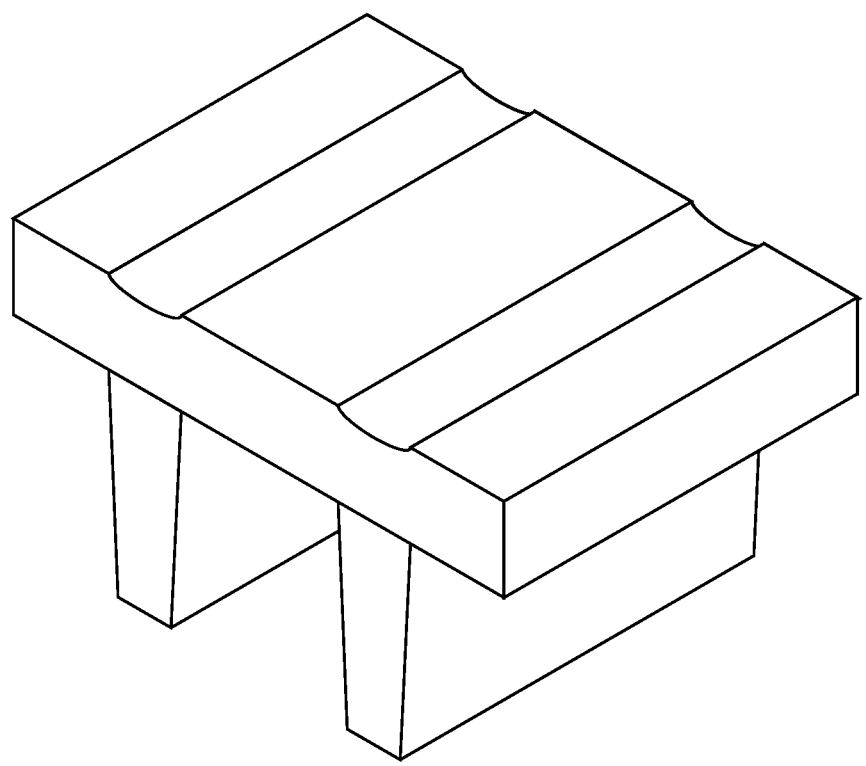
FIG. 5A is a drawing showing an example of sink marks.
Figure 5B:
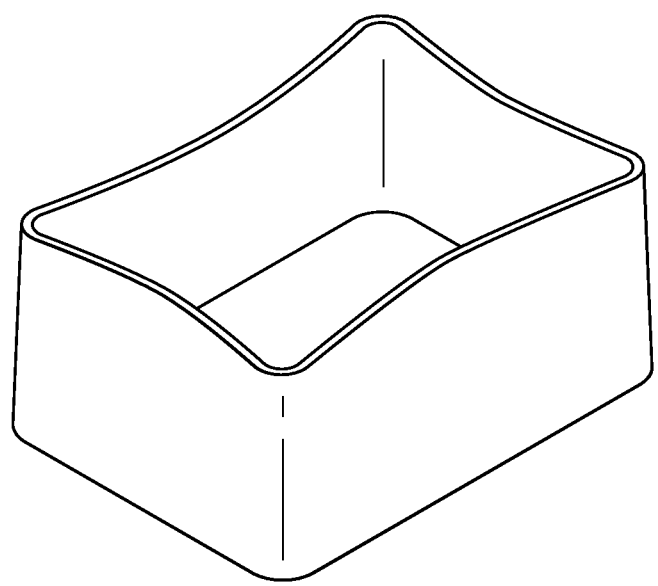
FIG. 5B is a drawing showing an example of warpages.
Figure 5C:
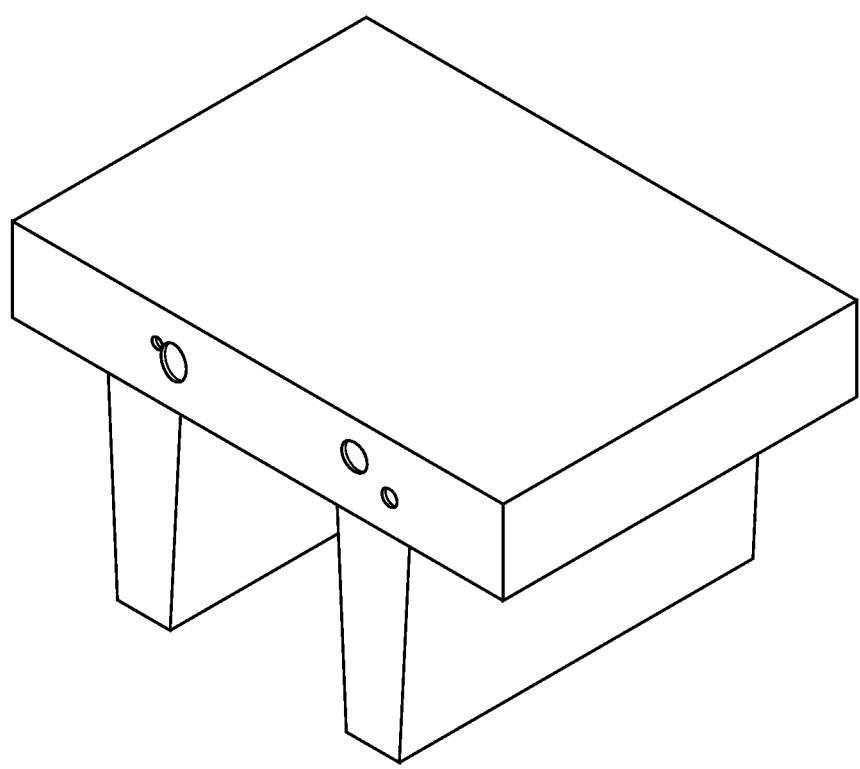
FIG. 5C is a drawing showing an example of voids.

FIG. 5A is a drawing showing an example of sink marks. FIG. 5B is a drawing showing an example of warpages. FIG. 5C is a drawing showing an example of voids. "Sink marks" as described here are depressions and recesses caused by molding shrinkage of plastic etc. "Warpages" is caused by residual stresses in the plastic etc. "Voids" are caused by air already present in the material or when the internal stress is pressure reduced (vacuum void).

Similarly to the state observation unit 201, the label acquisition unit 202 may acquire the aforementioned label data until a highly experienced worker pushes the condition adjustment completion button as an adjustment completion input unit (not shown) displayed on the display unit 102 when molding condition adjustment has finished and good articles can be molded and the machine learning device 20 receives the molding condition adjustment completion signal. It is preferable that, similarly to the state observation unit 201, the label acquisition unit 202 also receives as label data images in which the molding defect in the focus area has been eliminated and the molding has been determined to be good. By doing so, an unbiased learning model can be generated.

Further, a plurality of molding defect types may be input into the label acquisition unit 202 for one image of a focus area. By doing so, machine learning of molding defects can be carried out individually or in combination.

The learning unit 203 receives the set of the input data and the label described above as training data, and, using the received training data, carries out supervised learning to construct a learned model 240 that estimates a molding defect type based on a partial image of the molded article which constitutes the image of the focus area.

The learning unit 203 then stores the constructed learned model 240 in the storage unit 204 described below.

It is preferable that multiple items of training data for the supervised learning are prepared. Therefore, training data of molding defect types of the molded article may be created in which, for example, a highly experienced worker has evaluated every image of the focus area when adjusting the molding conditions.

Figure 6:
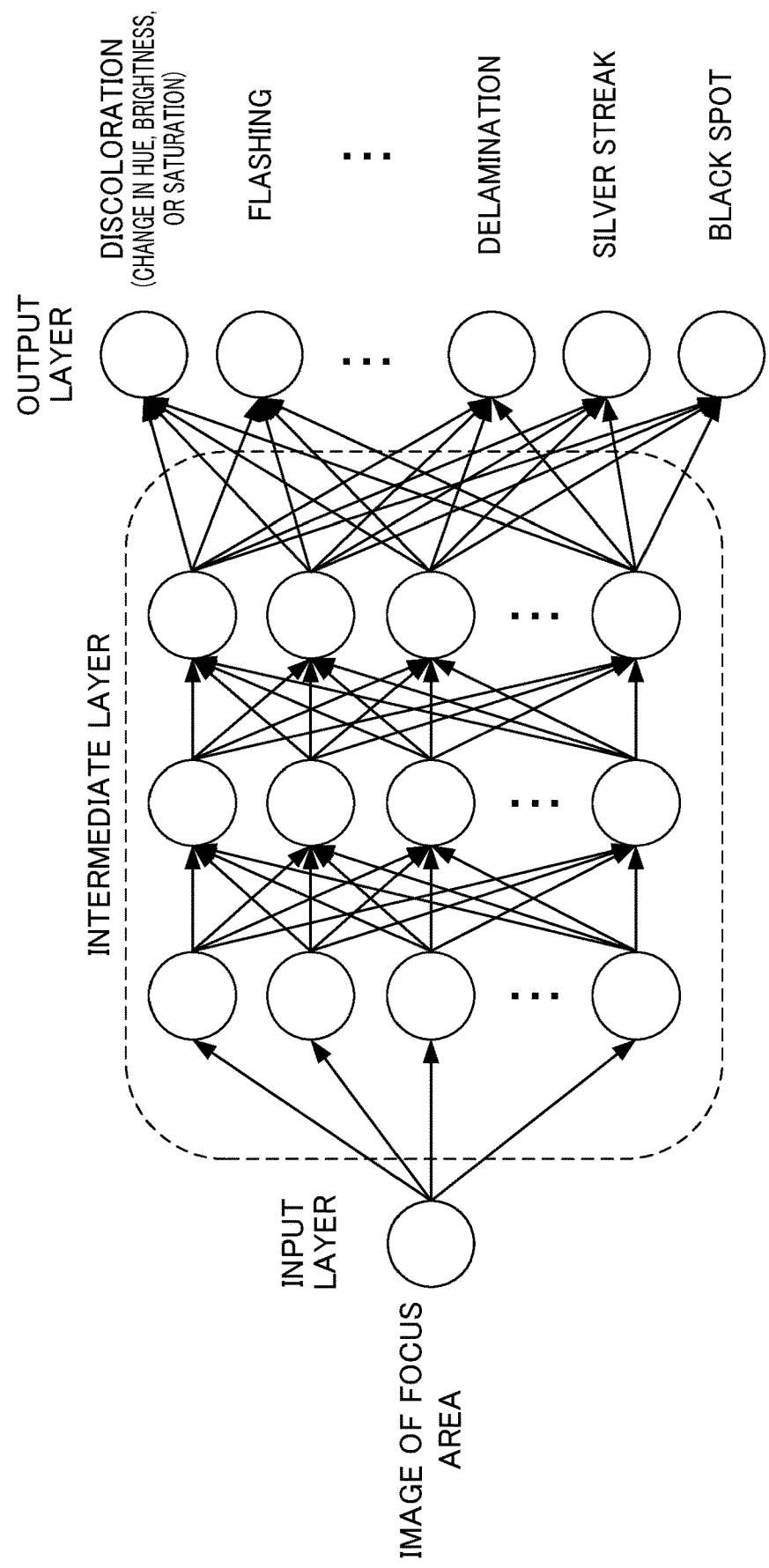
FIG. 6 is a drawing showing an example of a learned model generated by a machine learning device shown in FIG. 1.

FIG. 6 is a drawing showing an example of the learned model 240 generated by the machine learning device 20 shown in FIG. 1. Here, as shown in FIG. 6, an example of the learned model 240 is shown as a multilayer neural network in which an input layer is the image of the focus area which consists of a partial image of the molded article that is injection molded after the molding condition adjustment, and an output layer is data indicating a molding defect type of the molded article in the image of the focus area.

Here, molding defect types include discoloration (change in hue, brightness, or saturation), flashing, sink marks, warpages, twisting, voids, short shot, weld lines, jetting, flow marks, stringiness, insufficient filling, delamination, silver streaks, and black spots.

The output of each molding defect type may be "0" or "1" (i.e. "not present" or "present"), or a value between "0" and "1". If the output of each molding defect type is a value between "0" and "1", the machine learning device 20 may determine that molding defect types for which the value is equal to or greater than a preset threshold correspond to the molded article in the input image of the focus area.

In addition, if the outputs of all the molding defect types is "0", the machine learning device 20 may determine that the molded article in the image of the focus area is a "good article".

As mentioned above, there are cases in which different molding defects may occur in combination. For example, if the resin temperature is too high, flashing and stringiness may occur in combination, and if the injection speed is not optimal, jetting and flow marks may occur simultaneously. The learning unit 203 may therefore be configured to carry out machine learning of molding defects individually or in combination. By doing so, the learned model 240 can estimate multiple molding defect types based on the input of one image of the focus area.

In addition, if the learning unit 203 has acquired new training data after constructing the learned model 240, the constructed learned model 240 may be updated by carrying out further supervised learning with respect to the learned model 240.

Further, the machine learning device 20 may share the learned model with a machine learning device 20 of another injection molding system 1 to perform supervised learning. By doing so, it becomes possible to carry out supervised learning distributed among respective machine learning devices 20 of a plurality of injection molding systems 1, thereby increasing efficiency of the supervised learning.

The supervised learning described above may be carried out through online learning. In addition, the supervised learning may be carried out through batch learning. In addition, the supervised learning may be carried out through mini-batch learning.

Online learning refers to a learning method in which supervised learning is immediately carried out every time molding conditions of the article to be molded by the injection molding machine 10 are adjusted and training data is created. Batch learning refers to a learning method in which, while molding conditions of the article to be molded by the injection molding machine 10 are adjusted and training data is created repeatedly, a plurality of items of training data corresponding to the number of repetitions are collected and supervised learning is carried out using all the training data. Mini-batch learning refers to a learning method that falls in between online learning and batch learning, in which supervised learning is carried out when a certain amount of training data has been accumulated.

The storage unit 204 is RAM or the like, and stores the input data acquired by the state observation unit 201, the label data acquired by the label acquisition unit 202, and the learned model 240 constructed by the learning unit 203.

The machine learning process for generating the learned model 240 of the machine learning device 20 has been described above.

Next, the machine learning device 20 in the operation phase, functioning as a determination device for determining whether molded articles after mass-production molding has started are good or defective, will be described below. In the following description, an example is shown in which the learned model described in FIG. 6 is used as the learned model, in other words, a multilayer neural network in which the input layer is the image of the focus area which consists of a partial image of the molded article after mass-production molding has started, and the output layer is a molding defect type of the molded article.

<Machine Learning Device 20 in the Operation Phase>

As shown in FIG. 1, the machine learning device 20 in the operation phase, functioning as a determination device for determining whether molded articles after mass-production molding has started are good or defective, includes the storage unit 204, an input unit 205, and a determination unit 206.

The input unit 205 inputs the image of the focus area which consists of a partial image of the molded article after mass-production molding has started from, for example, the line-of-sight direction camera 302.

The input unit 205 outputs the input image of the focus area to the determination unit 206.

It should be noted that in the operation phase, the worker wearing the line-of-sight measuring device 30 may be a worker other than a highly experienced worker.

The determination unit 206 inputs the input image of the focus area into the learned model 240 shown in FIG. 6 and determines the molding defect type of the molded article in the image of the focus area. The determination unit 206 then outputs the determined result of the molding defect type regarding the image of the focus area to, for example, the injection molding machine 10 (display device 102).

Based on the received determined result, the display device 102 of the injection molding machine 10 displays the molding defect type automatically recognized by the machine learning device 20. This allows a worker to confirm the automatically determined type of molding defect.

In this case, a worker may, for example, stop the molding, or discard the defective article by inputting a signal into a well-known good/defective article sorting device (not shown).

If the molding defect is eliminated by the worker stopping the molding and adjusting the molding conditions for the molded article, the worker can be notified via the display device 102 that the molding defect has been eliminated. The display device 102 may be configured to notify that the molding defect has been eliminated by deleting the display relating to the molding defect.

In addition, when the control device 101 of the injection molding machine 10 has automatically recognized a molding defect based on the received determined result, the automatically recognized molding defect locations of the molded article may be displayed magnified on the display device 102. This makes it easier to see the molding defect location and makes determining whether or not the molding is good more efficient. The magnification of the magnified display may be preset at x2, x5, etc. The magnified display may also be magnified as much as possible within a range that includes the area of the automatically recognized molding defect and the full extent of the focus area.

<The Determination Process of the Machine Learning Device 20 in the Operation Phase>

Described next are the operations involved in the determination process by the machine learning device 20 functioning as a determination device for determining whether molded articles after mass-production molding has started are good or defective in the operation phase according to the present embodiment.

Figure 7:
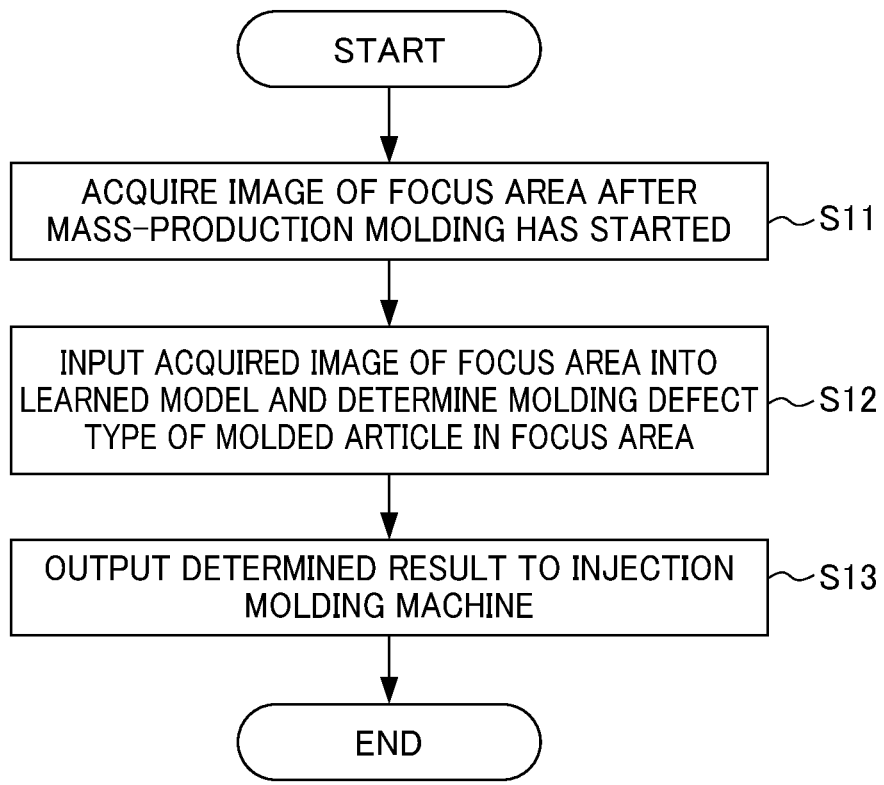
FIG. 7 is a flowchart describing a determination process by the machine learning device in an operation phase.

FIG. 7 is a flowchart describing a determination process by the machine learning device 20 in an operation phase At Step S11, the input unit 205 acquires the image of the focus area which consists of a partial image of the molded article after mass-production molding has started from the line-of-sight measuring device 30.

At Step S12, the determination unit 206 inputs the image of the focus area acquired at Step S11 into the learned model 240 and determine the molding defect type of the molded article in the focus area.

At Step S13, the determination unit 206 outputs the determined result of the molding defect type determined at Step S12 to the injection molding machine 10.

In this way, the injection molding system 1 according to the first embodiment extracts an image of a portion of a molded article that a highly experienced worker focused on when adjusting the molding conditions as an image of a focus area, inputs the extracted image of the focus area into a learned model 240, and determines a molding defect type in the molded article in the focus area. The injection molding system 1 thus allows a worker other than a highly experienced worker to easily spot locations in molded articles where molding defects can easily occur, and to easily determine the molding defect type.

The first embodiment has been described above.

Modification Example of the First Embodiment

The modification example of the first embodiment differs from the first embodiment in that the molded article in the learning phase and the molded article in the operation phase differ from each other.

Figure 8:
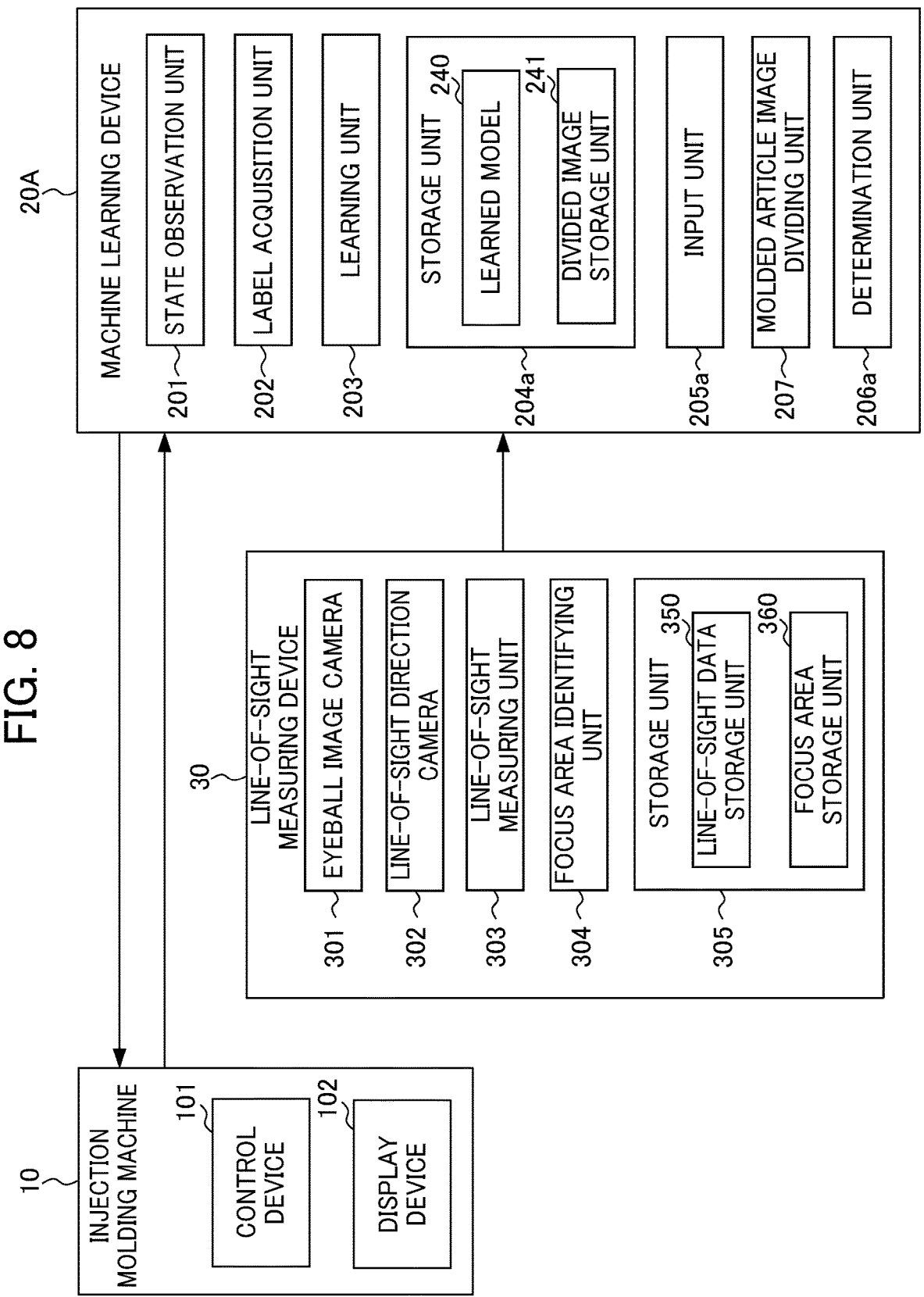
FIG. 8 is a functional block diagram showing a functional configuration example of an injection molding system according to a modification example of the first embodiment of the present invention.

FIG. 8 is a functional block diagram showing a functional configuration example of an injection molding system according to the modification example of the first embodiment. Functional blocks that have the same functions as in FIG. 1 are given the same reference numerals, and descriptions thereof are omitted.

<The Machine Learning Device 20A in the Learning Phase>

In the learning phase, a machine learning device 20A according to the modification example of the first embodiment includes a state observation unit 201, a label acquisition unit 202, a learning unit 203, and a storage unit 204a.

The state observation unit 201, the label acquisition unit 202, and the learning unit 203 have the same functions as the state observation unit 201, the label acquisition unit 202, and the learning unit 203 in the first embodiment.

In other words, the machine learning device 20A in the learning phase generates a learned model 240 like the machine learning device 20 according to the first embodiment.

The storage unit 204a, like the storage unit 204 according to the first embodiment, stores input data acquired by the state observation unit 201, label data acquired by the label acquisition unit 202, and the learned model 240 constructed by the learning unit 203.

<The Machine Learning Device 20A in the Operation Phase>

As shown in FIG. 8, the machine learning device 20A functioning as a determination device for determining whether molded articles are good or defective in the operation phase includes the storage unit 204a, an input unit 205a, a determination unit 206a, and a molded article image dividing unit 207. Here, the operation phase according to the modification example of the first embodiment includes a case in which the molded article learned in the learning phase and the molded article in the operation phase differ from each other.

Since the molded article that is injection molded by the injection molding machine 10 after the molding condition adjustment differs from the molded article in the learning phase, and the focus area in the operation phase thus becomes unknown, the input unit 205a acquires an image of the whole molded article subject to determination (hereinafter referred to as "whole image") from, for example, the line-of-sight direction camera 302. The input unit 205a outputs the acquired whole image to the molded article image dividing unit 207.

The molded article image dividing unit 207 divides the whole image input by the input unit 205a.

Figure 9:
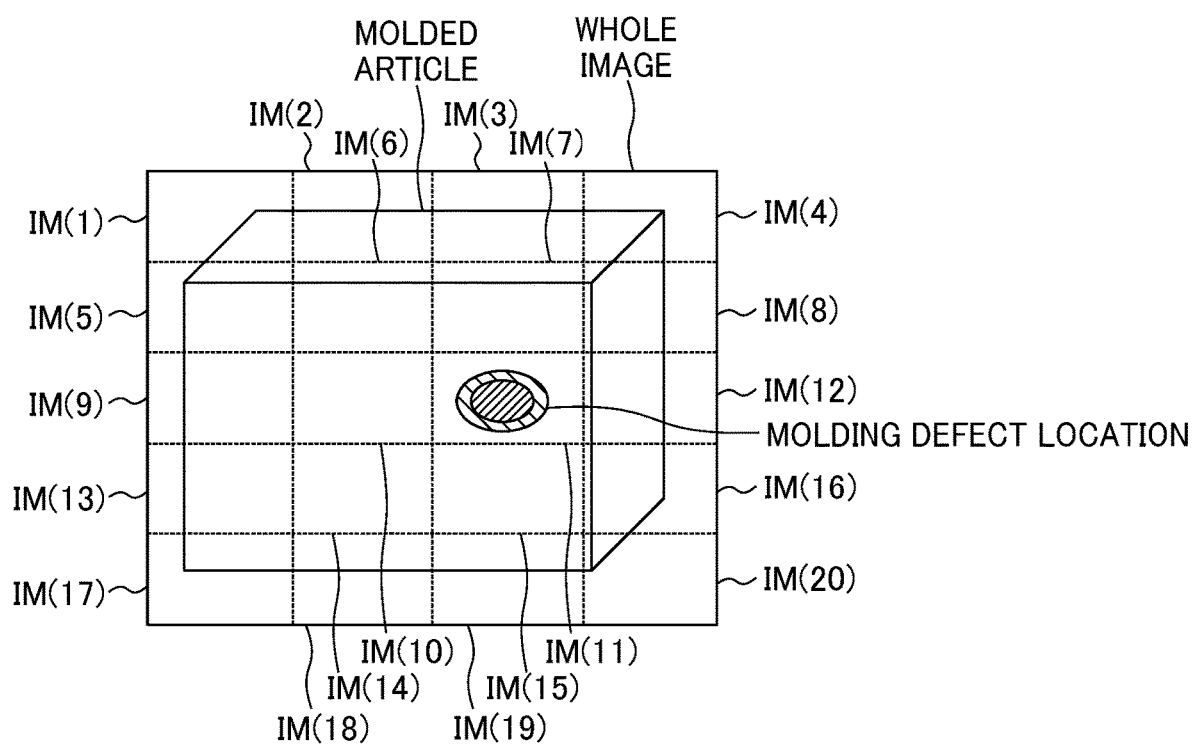
FIG. 9 is a drawing showing an example of divided images that are divided from a whole image.

FIG. 9 is a drawing showing an example of divided images that are divided from a whole image.

As shown in FIG. 9, the molded article image dividing unit 207 divides the whole image input by the input unit 205a into, for example, 20 divided images IM(1) to IM(20). The molded article image dividing unit 207 stores the divided images IM(1) to IM(20) in a divided image storage unit 241 of the storage unit 204a.

It should be noted that while the molded article image dividing unit 207 divides the whole image into 20 divided images IM(1) to IM(20), it is not so limited, and may divide the whole image into a number of divided images other than 20.

Hereinafter, when there is no need to differentiate between each of the divided images IM(1) to IM(20), they are referred to collectively as the "divided images IM".

The determination unit 206a reads the divided images IM from the divided image storage unit 241. The determination unit 206a inputs each of the read divided images IM into the learned model 240 shown in FIG. 6 and determines the molding defect type of the molded article in the divided images IM. The determination unit 206a then outputs the determined result of the molding defect type of each of the determined divided images IM to the injection molding machine 10.

The display device 102 of the injection molding machine 10 may display, for each divided image IM, a molding defect type automatically recognized by the machine learning device 20 based on the determined result of each of the received divided images IM. This allows a worker to confirm the automatically determined type of molding defect and to confirm in which portion of the molded article the molding defect has occurred.

<The Determination Process by the Machine Learning Device 20A in the Operation Phase>

Next, the operations involved in the determination process by the machine learning device 20A according to the modification example of the first embodiment will be described.

Figure 10:
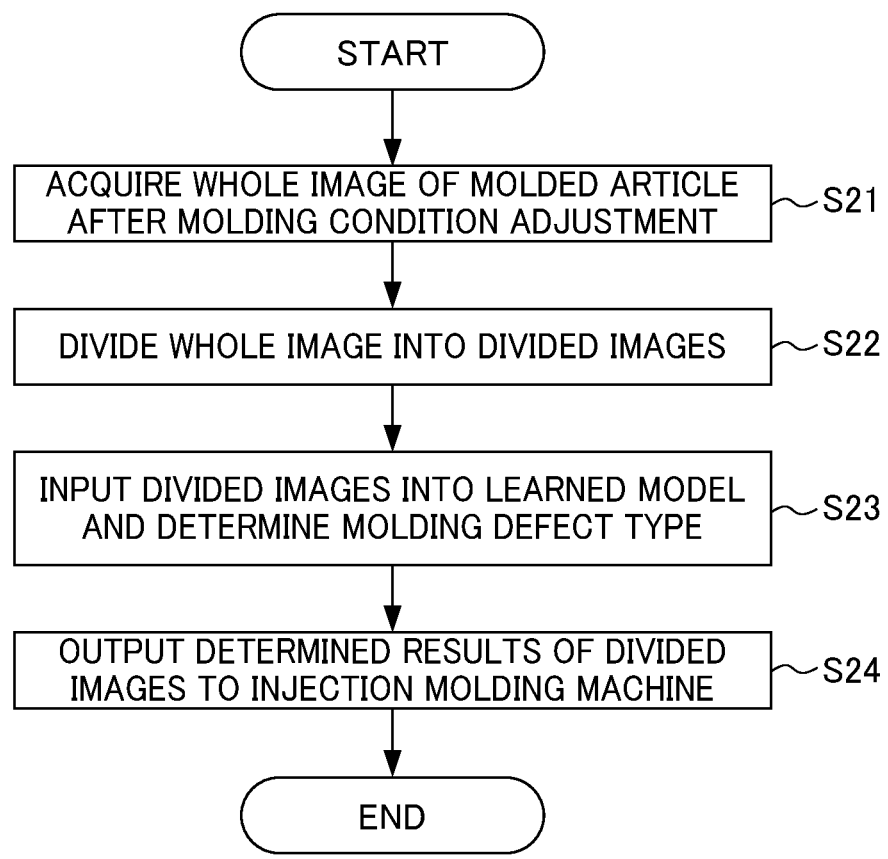
FIG. 10 is a flowchart describing a determination process by the machine learning device in an operation phase.

FIG. 10 is a flowchart describing the determination process by the machine learning device 20A in the operation phase.

At Step S21, the input unit 205a acquires, from the line-of-sight direction camera 302 or the like, a whole image of a molded article that is injection molded after the molding condition adjustment.

At Step S22, the molded article image dividing unit 207 divides the whole image acquired at Step S21 into divided images IM(1) to IM(20).

At Step S23, the determination unit 206a inputs the divided images IM divided at Step S22 into the learned model 240 and determines the molding defect type of the molded article in each divided image IM.

At Step S24, the determination unit 206a outputs the determined result of the molding defect type in each divided image IM determined at Step S23 to the injection molding machine 10.

In this way, the injection molding system 1 according to the modification example of the first embodiment also applies the learned model generated at the time of molding condition adjustment to a case in which the molded article injection molded by the injection molding machine 10 differs from the molded article that is the subject of the learned model (in other words, that was used at the time of learning).

In this case, since the focus area in the operation phase is unknown, a whole image of the molded article subject to determination is acquired from the line-of-sight measuring device 30. The injection molding system 1 divides the acquired whole image into a plurality of divided images IM. The injection molding system 1 inputs each of the divided images IM into the learned model 240 and determines the molding defect type of the molded article in each divided image IM. The injection molding system 1 thus allows a worker other than a highly experienced worker to easily spot locations in molded articles where molding defects can easily occur, and to easily determine the molding defect type, even in a case in which the molded article in the learning phase and the molded article in the operation phase differ from each other.

It should be noted that while the determination unit 206a in the operation phase described above determines a molding defect type of the molded article in all of the divided images IM, the invention is not so limited.

For example, the determination unit 206a may determine molding defect types for a predetermined number (e.g., 50, 100, etc.) of divided images IM of the same molded article to calculate the occurrence frequency of molding defects for each divided image IM.

By doing so, the determination unit 206a may set a divided image IM that exhibits an occurrence frequency that is equal to or greater than a preset threshold as the image of the focus area. Then, for subsequent molded articles (beyond the predetermined number), the determination unit 206a may input only the divided image IM set as the image of the focus area into the learned model 240 and determine the molding defect type.

The injection molding system 1 can thus efficiently determine the molding defect type of each molded article.

The predetermined number and the threshold may be set as appropriate according to the required cycle time, quality of the molded articles, etc.

The modification example of the first embodiment has been described above.

Described next is a second embodiment capable of further improving the recognition rate of molding defects through machine learning using molding defect-related images of various types of molded articles.

Second Embodiment

In the first embodiment and the modification example of the first embodiment, the learned model was generated through machine learning using molding defect-related images of one molded article. The learned model was then used to determine molding defects in the molded article by the machine learning device 20 functioning as a molding defect determination device after mass-production molding had started.

By contrast, the second embodiment performs machine learning using molding defect-related images of various types of molded articles to further improve the recognition rate of molding defects. In the second embodiment, it is possible, with respect to each molded article of a variety of molded articles, to proceed with machine learning through supervised learning, based on an image of the focus area identified by a highly experienced worker at the time of the molding condition adjustment by the highly experienced worker and label data regarding whether or not the molding is good, like in the first embodiment. This makes it easier to automatically recognize whether or not the molding is good, even when the molded articles differ. One reason for this is that even if the molded articles differ, the images of the molding defect area are often similar.

Specifically, listing a few image features due to molding defects, when discoloration or black spots occur, the hue, brightness, saturation, etc. in the area of occurrence clearly changes. In addition, when silver streaks occur, a whitened fan-like pattern appears in the image. In addition, voids appear in the image as spherical bubble patterns in the transparent molded article. In addition, weld lines appear in the image as thin, long lines. It should be noted that thin, long lines can also be seen in the image when the shape of the molded article has peaks and valleys, which appear in the image with different hues since the incidence angle of light from a light source differs on either side of the line, but since this difference in hue is not present in the case of weld lines, it is possible to tell the difference between weld lines and the shape of the molded article.

In this way, molded defect features that a worker would conventionally check visually can be machine-learned using molding defect-related images of a variety of molded articles, which enables increased recognition accuracy of molding defects.

<The Machine Learning Device in the Learning Phase>

Specifically, with respect to each molded article of a variety of molded articles, like in the first embodiment, the machine learning device 20 carries out supervised learning using training data consisting of an image of the focus area identified by a highly experienced worker at the time of the molding condition adjustment by the highly experienced worker and label data regarding whether or not the molding is good, whereby a learned model can be generated which allows for recognition of features of molding defect areas of a variety of molded articles. By doing so, the recognition rate of molding defects with respect to any given molded article in the operation phase can be improved.

<The Machine Learning Device in the Operation Phase>

The machine learning device in the operation phase has similar functions to the operation phase of the modification example of the first embodiment described above.

Specifically, the input unit 205a acquires an image of the whole molded article subject to determination (hereinafter referred to as "whole image") from, for example, the line-of-sight direction camera 302. The input unit 205a outputs the acquired whole image to the molded article image dividing unit 207.

The molded article image dividing unit 207 divides the whole image input by the input unit 205a into, for example, 20 divided images IM(1) to IM(20), as shown in FIG. 9. The molded article image dividing unit 207 stores the divided images IM(1) to IM(20) in the divided image storage unit 241 of the storage unit 204a.

It should be noted that while the molded article image dividing unit 207 divides the whole image into 20 divided images IM(1) to IM(20), it is not so limited, and may divide the whole image into a number of divided images other than 20.

Hereinafter, when there is no need to differentiate between each of the divided images IM(1) to IM(20), they are referred to collectively as the "divided images IM".

The determination unit 206a reads the divided images IM from the divided image storage unit 241. The determination unit 206a inputs each of the read divided images IM into the learned model 240 shown in FIG. 6 and determines the molding defect type of the molded article in the divided images IM. The determination unit 206a then outputs the determined result of the molding defect type of each of the determined divided images IM to the injection molding machine 10.

The display device 102 of the injection molding machine 10 may display, for each divided image IM, a molding defect type automatically recognized by the machine learning device 20 based on the determined result of each of the received divided images IM. This allows a worker to confirm the automatically determined type of molding defect and to confirm in which portion of the molded article the molding defect has occurred.

In this way, by carrying out machine learning using molding defect-related images of a variety of molded articles, the recognition rate of molding defects can be further improved.

Further, like in the operation phase of the modification example of the first embodiment, the determination unit 206a may determine molding defect types for a predetermined number (e.g., 50, 100, etc.) of divided images IM of the same molded article to calculate the occurrence frequency of molding defects for each divided image IM.

By doing so, the determination unit 206a may set a divided image IM that exhibits an occurrence frequency that is equal to or greater than a preset threshold as the image of the focus area. Then, for subsequent molded articles (beyond the predetermined number), the determination unit 206a may input only the divided image IM set as the image of the focus area into the learned model 240 and determine the molding defect type.

Thus, the injection molding system 1 can thus efficiently determine the molding defect type of each molded article in the second embodiment as well.

The first embodiment, the modification example of the first embodiment, and the second embodiment are described above, but the injection molding system 1 is not limited to above embodiments, but may include modifications and improvements within a scope capable of achieving the object of the invention.

First Modification Example

In the first embodiment, the modification example of the first embodiment, and the second embodiment described above, the machine learning device 20 (20A) is exemplarily described as a device separate from the injection molding machine 10, but the injection molding machine 10 may be configured to include part or all of the functions of the machine learning device 20 (20A).

Alternatively, part or all of the functions of the state observation unit 201, label acquisition unit 202, learning unit 203, storage unit 204, input unit 205, and determination unit 206 of the machine learning device 20, or the state observation unit 201, label acquisition unit 202, learning unit 203, storage unit 204a, input unit 205a, determination unit 206a, and molded article image dividing unit 207 of the machine learning device 20A may be included, for example, in a server. The functions of the machine learning device 20 (20A) may also be realized using a virtual server on the cloud.

Further, the machine learning device 20 (20A) may be a distributed processing system in which the functions of the machine learning device 20 (20A) are distributed over multiple servers, as necessary.

This enables machine learning with even more data. This also allows for sharing of information between remote factories.

Second Modification Example

As another example, in the first embodiment, the modification example of the first embodiment, and the second embodiment described above, when the molding conditions had been adjusted allowing for a good article to be molded, a molding condition adjustment completion button (not shown) was displayed as an adjustment completion input unit on the display device 102 of the injection molding machine 10 and the completion of the molding condition adjustment was input into the machine learning device 20

(20A), but the invention is not so limited. For example, the injection molding system 1 may have, as an adjustment completion input unit, either a molding condition adjustment completion button or an automatic button that starts continuous molding provided to a control panel, whereby completion of the molding condition adjustment may be input into the machine learning device 20 (20A) by a worker pressing the button. Alternatively, the injection molding system 1 may include a voice recognition device that recognizes molding condition adjustment completion through voice recognition and notifies the machine learning device 20 (20A) that the system is in a state of molding good articles.

Third Modification Example

As another example, in the first embodiment, the modification example of the first embodiment, and the second embodiment described above, when a highly skilled worker pressed the molding condition adjustment completion button (not shown) displayed as an adjustment completion input unit on the display device 102 when the molding conditions had been adjusted allowing for a good article to be molded, the injection molding system 1 output a molding condition adjustment completion signal to the machine learning device 20 (20A) to generate a learned model 240 through machine learning, but the invention is not so limited.

For example, the injection molding system 1 may include a good/defective determination signal output unit that outputs a good article determination signal when it has been determined based on the learning result of the machine learning and molded article image data that good articles are being molded, and a mass-production molding starting signal output unit that outputs a mass-production molding starting signal when input with the good article determination signal output by the good/defective determination signal output unit.

By including the good/defective determination signal output unit and the mass-production molding starting signal output unit, the injection molding system 1 may be configured to start mass-production molding when it has been determined that good articles can be molded. This is effective at the molding starting time, and while conventionally a worker would start mass-production molding after having visually checked the molded articles while molding anything from a few shots to several hundred shots at the molding starting time to determine that good articles could be molded, these tasks can be automated. Further, if the good/defective determination signal output unit outputs a defective article determination signal during continuous molding, it is easy to stop molding or to input the signal into a well-known good/defective article sorting device to discard the defective articles.

Fourth Modification Example

Figure 11:
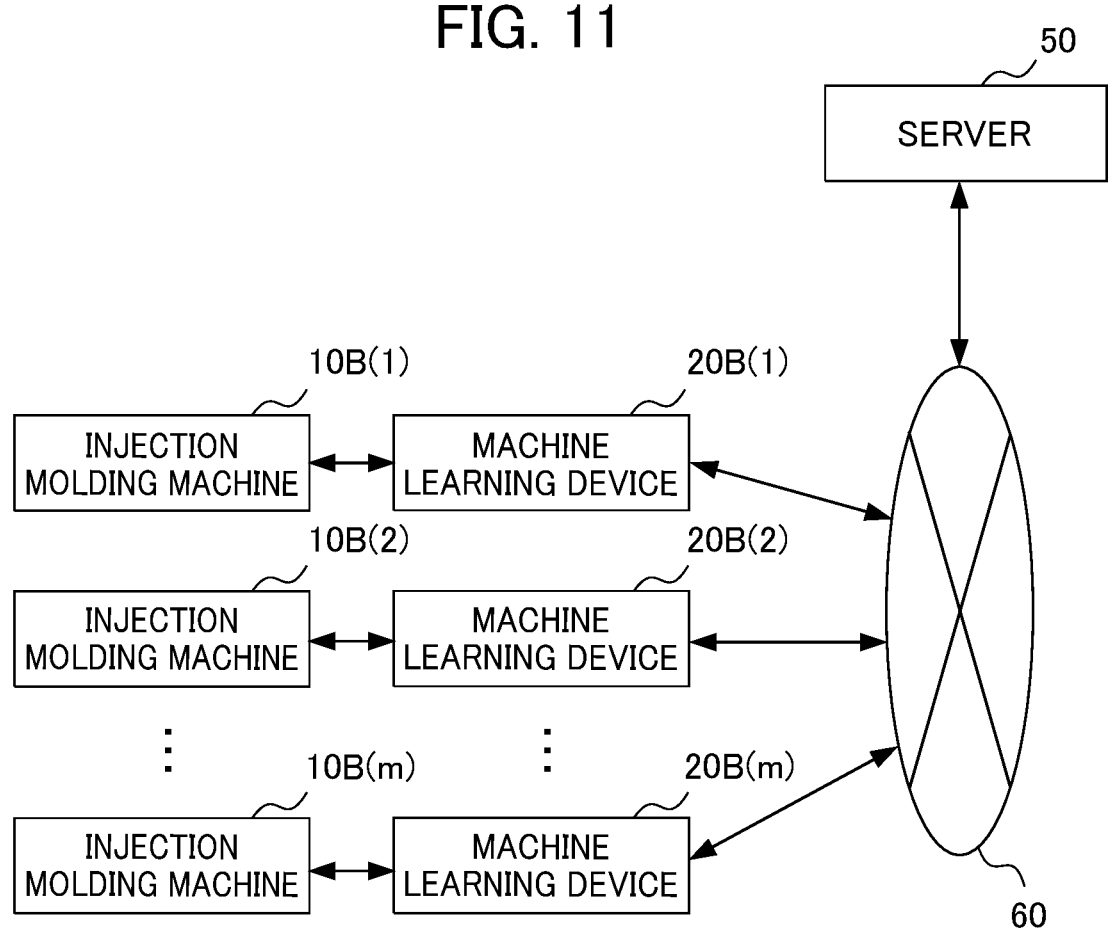
FIG. 11 is a drawing showing an example of the configuration of the injection molding system.

As another example, in the first embodiment, the modification example of the first embodiment, and the second embodiment described above, the machine learning device 20, using the learned model 240, determined the molding defect type of a molded article in a focus area from an image of the focus area acquired from one line-of-sight measuring device 30, but the invention is not so limited. For example, as shown in FIG. 11, a server 50 may store the learned model 240 generated by the machine learning device 20 and share the learned model 240 with m number of machine learning devices 20B(1) to 20B(m) (where m is an integer equal to or greater than 2) connected to a network 60. This makes it possible to apply the learned model 240 even if new injection molding machines and machine learning devices are added.

Further, each of the machine learning devices 20B(1) to 20B(m) is respectively connected to each of the injection molding machines 10B(1) to 10B(m).

Each of the injection molding machines 10B(1) to 10B(m) corresponds to the injection molding machine 10 shown in FIG. 1. Each of the machine learning devices 20B(1) to 20B(m) corresponds to the machine learning device 20 (20A) shown in FIG. 1.

Figure 12:
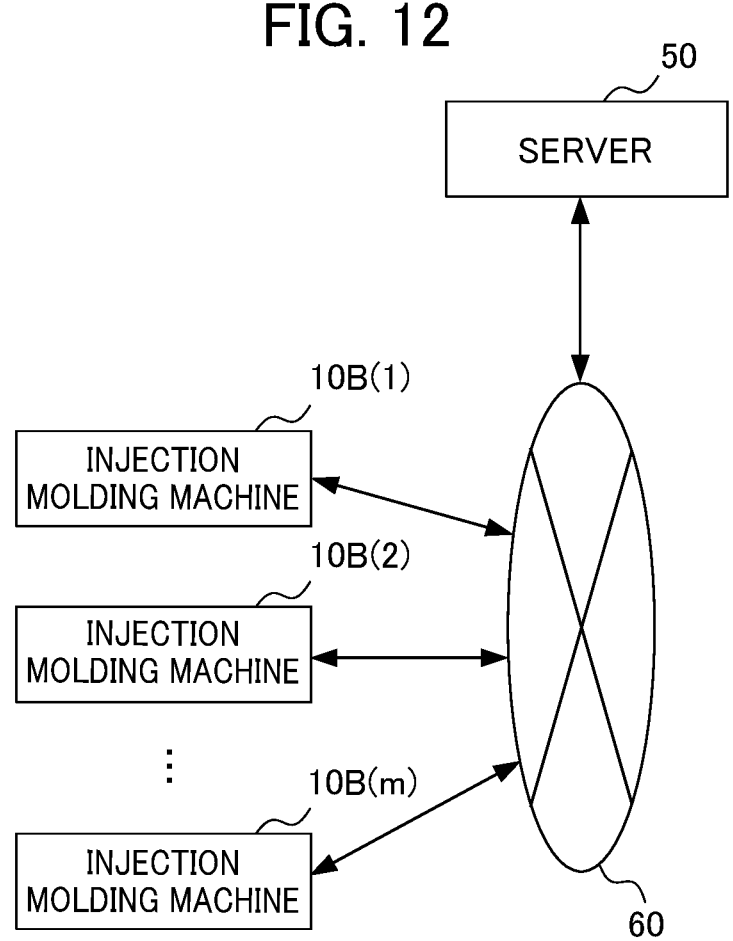
FIG. 12 is a drawing showing an example of the configuration of the injection molding system.

Alternatively, as shown in FIG. 12, the server 50 may, for example, operate as a machine learning device 20 and determine a molding defect type of a molded article with respect to each of the injection molding machines 10B(1) to 10B(m) connected to the network 60. This makes it possible to apply the learned model 240 even if new injection molding machines are added.

Moreover, the functions included in the injection molding system 1 according to the first embodiment, the modification example of the first embodiment, and the second embodiment may respectively be realized by hardware, software, or a combination thereof. Here, being "realized by software" means being realized by a computer reading and executing a program.

Further, the components included in the injection molding system 1 may be realized by hardware including electronic circuits, software, or a combination thereof.

The program may be stored using various types of non-transitory computer-readable media and provided to a computer. Non-transitory computer-readable media include various types of tangible storage media. Examples of non-transitory computer-readable media include magnetic storage media (e.g., flexible discs, magnetic tapes, hard disk drives), magneto-optical storage media (e.g., magneto-optical discs), CD-ROM (Read Only Memory), CD-R, CD-R/W, semiconductor memories (e.g., mask ROM, PROM (Programmable ROM), EPROM (Erasable PROM), flash ROM, and RAM). In addition, the program may be provided to the computer by various types of transitory computer-readable media. Examples of transitory computer-readable media include electric signals, optical signals, and electromagnetic waves. Transitory computer-readable media may provide the program to the computer via wired communication paths such as electric wires and optical fibers, etc., or via wireless communication paths.

It should be noted that the steps describing the program stored in the storage medium obviously include a process executed chronologically according to the order thereof, and also includes processes executed parallel or separately, and not necessarily in chronological order.

Rephrasing the above description, the injection molding system according to the present disclosure may take on embodiments having the following configurations.

(1) The injection molding system 1 according to the present disclosure includes a line-of-sight measuring unit 303 configured to measure a movement of a line of sight of a worker observing a molded article molded by injection molding; a line-of-sight data storage unit 350 configured to store line-of-sight information representing movements of the worker's line of sight measured by the line-of-sight measuring unit 303 and a measurement time at which the line-of-sight information was measured; a focus area identifying unit 304 configured to, based on the line-of-sight information and the measurement time, identify a focus area of the molded article that the worker has focused on for a predetermined time or more and/or looked at a predetermined number of times or more; a focus area storage unit 360 configured to store an image of the focus area identified by the focus area identifying unit 304 out of images of the molded article; a molding defect type input unit configured to input or select a molding defect type; and a machine learning device 20 configured to machine learn the molding defect type from the image of the focus area, wherein the machine learning device 20 inputs a type of a molding defect that has occurred in the molded article and carries out machine learning to learn and automatically recognize a feature quantity of the molding defect from the image of the focus area stored in the focus area storage unit 360.

This injection molding system 1 allows a worker other than a highly experienced worker to easily spot locations of a molded article where molding defects can easily occur.

(2) The injection molding system 1 according to (1) may further include a molded article image capturing unit; and a display device 102, wherein the line-of-sight measuring unit 303 may measure the line-of-sight information of the worker visually checking the image of the molded article captured by the molded article image capturing unit and displayed on the display unit 102.

This makes it possible to identify the focus area.

(3) In the injection molding system 1 according to (1) or (2), the molding defect may be at least one or more of discoloration change in hue, brightness, or saturation of the molded article, flashing, sink marks, warpages, twisting, voids, short shot, weld lines, jetting, flow marks, stringiness, insufficient filling, delamination, silver streaks, and black spots.

This makes it possible to carry out machine learning of molding defects individually or in combination.

(4) In the injection molding system 1 according to any of (1) to (3), the machine learning device 20, upon automatically detecting the molding defect, may cause the display device 102 to display the type of the molding defect.

This allows a worker to confirm the automatically determined type of molding defect. In addition, in case the molding defect has been eliminated, deleting the display may notify the worker that the molding defect has been eliminated.

(5) The injection molding system 1 according to any of (1) to (4) may further include an adjustment completion input unit for inputting a molding condition adjustment completion signal into the machine learning device 20 when a molding condition adjustment has been completed.

This makes it possible to notify the machine learning device 20 that the system is in a state where good articles are being molded.

(6) In the injection molding system 1 according to (5), the adjustment completion input unit detects that any of a button displayed on a controller screen of the injection molding machine 10, a button on a control panel, or an automatic button that starts continuous molding has been pressed, or a voice recognition device detects adjustment completion.

This makes it possible to notify the machine learning device 20 that the system is in a state where good articles are being molded.

(7) The injection molding system 1 according to any of (1) to (6) may further include a good/defective determination signal output unit configured to perform a good/defective determination and output a good or defective determination signal based on a learning result of the machine learning device 20 and the image of the focus area.

This makes it possible to report that good articles can be molded.

(8) The injection molding system 1 according to (7) may further include a mass-production molding starting signal output unit configured to output a mass-production starting signal when the good/defective determination signal output unit has determined that good articles are being molded and outputs a good article determination signal, wherein when it has been determined that good articles can be molded, mass-production molding is started.

This makes it possible to automate the tasks from when it has been determined that good articles can be molded to the start of mass-production molding.

(9) In the injection molding system 1 according to (7) or (8), the good/defective determination signal output unit, upon determining that defective articles are being molded and outputting a defective article determination signal, may stop mass-production molding and/or inputs a defective article determination signal into a good/defective article sorting device to discard defective articles.

This makes it easy to stop molding or input a signal to a good/defective article sorting device to discard defective articles.

(10) The injection molding system 1 according to any of (1) to (9) further includes a molded article image dividing unit 207 configured to divide an image of the molded article into a plurality of divided images IM; and a divided image storage unit 241 configured to store the plurality of divided images IM divided by the molded article image dividing unit 207, wherein the machine learning device 20 carries out machine learning with the plurality of divided images IM divided by the molded article image dividing unit 207.

This makes it possible to magnify the molding defect features of even minute molding defects so they can be more easily spotted, which allows for more accurate determination of whether the article is good or defective.

(11) The injection molding system 1 according to any of (1) to (10) may further include a communication unit in communication with a plurality of the injection molding systems 1 or a central control device (server 50), wherein molded article image data, machine learning results, and learned models 240 of the plurality of injection molding systems 1 may be shared to carry out machine learning.

This allows for machine learning with more data. Further, the central control device may be on the cloud, which allows for information to be shared between remote factories.

(12) In the injection molding system 1 according to (2), when the machine learning device 20 has automatically recognized the molding defect or when the focus area identifying unit 304 has identified the focus area of the worker, the display device 102 may magnify and display a location of the automatically recognized molding defect or the focus area.

This makes molding defect locations easier to spot, which enables improved efficiency of the molding condition adjustment.

(13) The injection molding system 1 according to (2) may further include a molded article capturing position moving unit that makes the molded article image capturing unit movable.

This makes it possible to capture images of the molded article from various directions in cases where molding defects are hard to confirm visually due to reflection of light etc., which makes it easier to spot molding defect locations.

EXPLANATION OF REFERENCE NUMERALS

1 Injection molding system
10 Injection molding machine

101 Control device
102 Display device
20 Machine learning device
201 Status observation unit
202 Label acquisition unit
203 Learning unit
204, 204a Storage unit
205, 205a Input unit
206, 206a Determination unit
207 Molded article image dividing unit
240 Learned model
30 Line-of-sight measuring device
303 Line-of-sight measuring unit
304 Focus area identifying unit
305 Storage unit

What is claimed is:

1. An injection molding system comprising:
a line-of-sight measuring unit configured to measure movements of a line of sight of a worker observing a molded article molded by injection molding;
a line-of-sight data storage unit configured to store line-of-sight information representing movements of the worker's line of sight measured by the line-of-sight measuring unit and a measurement time at which the line-of-sight information was measured;
a focus area identifying unit configured to, based on the line-of-sight information and the measurement time, identify a focus area of the molded article that the worker has focused on for a predetermined time or more and/or looked at a predetermined number of times or more;
a focus area storage unit configured to store an image of the focus area identified by the focus area identifying unit out of images of the molded article;
a molding defect type input touch screen configured to input or select a molding defect type; and
a machine learning device configured to machine learn the molding defect type from the image of the focus area,
wherein the machine learning device inputs a type of a molding defect that has occurred in the molded article and carries out machine learning to learn and automatically recognize a feature quantity of the molding defect from the image of the focus area stored in the focus area storage unit.

2. The injection molding system according to claim 1, further comprising:
a molded article image capturing unit; and
a display device,
wherein the line-of-sight measuring unit measures the line-of-sight information of the worker visually checking the image of the molded article captured by the molded article image capturing unit and displayed on the display device.

3. The injection molding system according to claim 2, wherein, when the machine learning device has automatically recognized the molding defect or when the focus area identifying unit has identified the focus area of the worker, the display device magnifies and displays a location of the automatically recognized molding defect or the focus area.

4. The injection molding system according to claim 2, further comprising a molded article capturing position moving robot that makes the molded article image capturing unit movable.

5. The injection molding system according to claim 1, wherein the molding defect is at least one or more of change in hue, brightness, or saturation of the molded article, flashing, sink marks, warpages, twisting, voids, short shot, weld lines, jetting, flow marks, stringiness, insufficient filling, delamination, silver streaks, and black spots.

6. The injection molding system according to claim 1, wherein the machine learning device, upon automatically detecting the molding defect, causes a display device to display the type of the molding defect.

7. The injection molding system according to claim 1, further comprising an adjustment completion input touch screen for inputting a molding condition adjustment completion signal into the machine learning device when a molding condition adjustment has been completed.

8. The injection molding system according to claim 7, wherein the adjustment completion input touch screen detects that any of a button displayed on a controller screen of an injection molding machine, a button on a control panel, or a button that starts continuous molding has been pressed, or a voice recognition device detects adjustment completion.

9. The injection molding system according to claim 1, further comprising a good/defective determination signal output unit configured to perform a good/defective determination and output a good or defective determination signal based on a learning result of the machine learning device and the image of the focus area.

10. The injection molding system according to claim 9, further comprising a mass-production molding starting signal output unit configured to output a mass-production starting signal when the good/defective determination signal output unit has determined that good articles are being molded and outputs a good article determination signal,
wherein when it has been determined that good articles are being molded, mass-production molding is started.

11. The injection molding system according to claim 9, wherein the good/defective determination signal output unit, upon determining that defective articles are being molded and outputting the defective article determination signal, stops mass-production molding and/or inputs a defective article determination signal into a good/defective article sorting device to discard defective articles.

12. The injection molding system according to claim 1, further comprising:
a molded article image dividing unit configured to divide an image of the molded article into a plurality of divided images; and
a divided image storage unit configured to store the plurality of divided images divided by the molded article image dividing unit,
wherein the machine learning device carries out machine learning with the plurality of divided images divided by the molded article image dividing unit.

13. The injection molding system according to claim 1, further comprising a communication unit in communication with a plurality of the injection molding systems or a central control device,
wherein molded article image data, machine learning results, and learned models of the plurality of injection molding systems are shared to carry out machine learning.

* * * * *